United States Patent [19]

Hamanaka

[11] 3,870,713

[45]*Mar. 11, 1975

[54] PHOSPHONO SUBSTITUTED ALKYLCEPHALOSPORINS

[75] Inventor: Ernest S. Hamanaka, Groton, Conn.

[73] Assignee: Pfizer Inc., New York, N.Y.

[*] Notice: The portion of the term of this patent subsequent to Aug. 6, 1974, has been disclaimed.

[22] Filed: Dec. 7, 1970

[21] Appl. No.: 95,918

[52] U.S. Cl. .............................. 260/243 C, 424/246
[51] Int. Cl. ............................................. C07d 99/24
[58] Field of Search ................................. 260/243 C

[56] References Cited
UNITED STATES PATENTS

| | | | |
|---|---|---|---|
| 3,558,601 | 1/1971 | Ekström et al. | 260/239.1 |
| 3,575,969 | 4/1971 | Morin et al. | 260/243 C |
| 3,632,578 | 1/1972 | Chauvette | 260/243 C |
| 3,647,781 | 3/1972 | Wieslogle et al. | 260/243 C |
| 3,651,050 | 3/1972 | Nakanishi | 260/243 C |

Primary Examiner—Nicholas S. Rizzo
Attorney, Agent, or Firm—Connolly and Hutz

[57] ABSTRACT

Broad spectrum antibacterial agents; namely, α-(phosphonoalkyl)- and α-(ω-phosphonoalkyl)cycloalkylcephalosporins of the formula

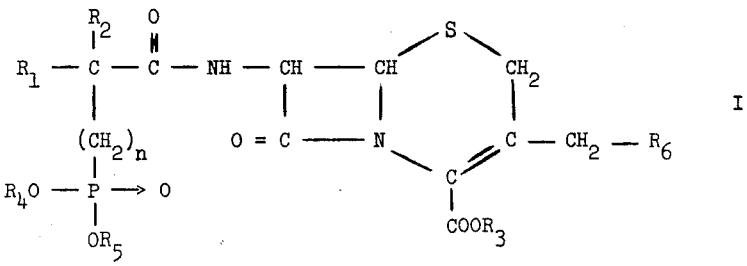

and the non-toxic cationic salts thereof wherein
$R_1$ is hydrogen, lower alkyl, phenyl and substituted phenyl wherein the substituent is lower alkyl, lower alkoxy, chloro, bromo, fluoro and trifluoromethyl;
$R_2$ is hydrogen;
$R_1$ and $R_2$ together with the carbon atom to which they are attached represent cycloalkyl of from three to seven carbon atoms;
$R_3$ is hydrogen and acyloxy lower alkyl wherein the acyloxy moiety is lower alkanoyloxy, benzoyloxy and substituted benzoyloxy wherein the substituent is chloro, bromo, fluoro, lower alkyl, lower alkoxy and trifluoromethyl;
each of $R_4$ and $R_5$ is hydrogen, lower alkyl, substituted lower alkyl wherein the substituent is lower alkoxy and fluoro; phenyl and substituted phenyl wherein the substituent is chloro, bromo, fluoro, lower alkyl, lower alkoxy and trifluoromethyl;
$R_6$ is hydrogen, hydroxy, acetoxy and tertiary amino;
and $n$ is 0 or an integer from 1 to 8, and intermediates therefor.

12 Claims, No Drawings

3,870,713

PHOSPHONO SUBSTITUTED ALKYLCEPHALOSPORINS

BACKGROUND OF THE INVENTION

This invention relates to a novel series of antibacterial agents and, more particularly, to α-(phosphono)- and α-(phosphonoalkyl)cephalosporins, to the non-toxic cationic salts and esters thereof, and to methods for their preparation. More particularly, it relates to novel α-(phosphono) and α-(ω-phosphonoalkyl)substituted derivatives of α-phenylacetyl- and cycloalkylformyl- derivatives of the amino acids: (a) 7-aminocephalosporanic acid; (b) desacetyl 7-aminocephalosporanic acid; (c) desacetoxy 7-aminocephalosporanic acid; to acyloxy lower alkyl esters of the 2-carboxy group of such amino acids and to methods for their preparation by acylation of the appropriate amino acid.

The term "cephalosporin" describes a group of acyl derivatives of 7-aminocephalosporanic acid which differ only in the nature of the R and/or $R_6$ groups and posses the general formula II wherein the acyl moiety is derived from a carboxylic acid or functional derivative thereof such as an acyl chloride or anhydride; and $R_6$ is acetoxy, hydrogen, hydroxy or a sulfur, nitrogen or carbon nucleophile:

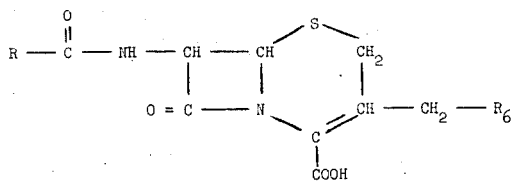

II

The properties, particularly the antibiotic properties, of a given cephalosporin are determined to a large extent by the R and $R_6$ groups. The best known and most widely used cephalosporins are cephalothin and cephaloridine wherein R is 2-thienyl and $R_6$ is acetoxy and N-pyridinium, respectively. These cephalosporins are highly antagonistic toward gram-positive microorganisms, and display characteristic activity against the so-called antibiotic resistant strains of bacteria and gram-negative organisms, important causes of severe infections and deaths in hospitals today. Further, they are of poor oral activity and must be given by injection. Therefore, drugs which will combat the continuing rise in *Staphylococci* incidence and fatality and gram-negative infections, e.g., *Pseudomonas*, are of immeasurable value to the medical profession.

Efforts to produce new cephalosporin antibiotics of greater efficacy have resulted in the preparation of a variety of cephalosporins, including several α-substituted benzyl cephalosporins, such as α-aminobenzyl-, α-carboxybenzyl-, α-carboxamidobenzyl-, α-alkanoyloxybenzyl- and α-cyanobenzylcephalosporins (Belgian Pat. No. 696,026; U.S. Pat. No. 3,341,532; U.S. Pat. No. 3,338,897 and Belgian Pat. No. 675,221, respectively).

SUMMARY OF THE INVENTION

It has now been found that α-(phosphono)- and α-phosphonoalkyl)- cephalosporins of the formula:

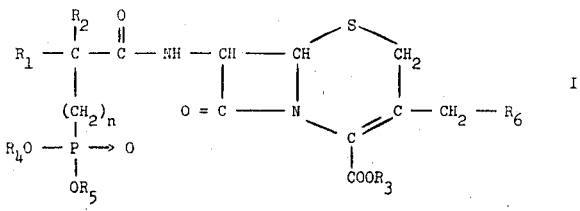

I and the non-toxic cationic salts thereof are effective antibacterial agents especially useful against *Pseudomonas* and other gram-negative bacteria. In the above formula $R_1$ is selected from the group consisting of hydrogen, lower alkyl, phenyl and substituted phenyl wherein the substituent is selected from the group consisting of lower alkyl, lower alkoxy, chloro, bromo, fluoro and trifluoromethyl;

$R_2$ is hydrogen;

$R_1$ and $R_2$ when taken together with the carbon atom to which they are attached are selected from the group consisting of cycloalkyl of from 3 to 7 carbon atoms;

$R_3$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl;

each of $R_4$ and $R_5$ is selected from the group consisting of hydrogen, lower alkyl, substituted lower alkyl wherein the substituent is selected from the group consisting of lower alkoxy and fluoro; phenyl and substituted phenyl wherein the substituent is selected from the group consisting of chloro, bromo, fluoro, lower alkoxy, lower alkyl and trifluoromethyl;

$R_6$ is selected from the group consisting of hydrogen, hydroxy, acetoxy and tertiary amino; and n is 0 or an integer from 1 to 8.

These novel compounds can exist in epimeric "D" and "L" forms. It will be convenient to refer to these epimers as the D- and L- epimers. Therefore, included within the purview of this invention are the D- and L-epimers and mixtures thereof of the compounds of formula I above, each of which exhibits substantial therapeutic activity.

Included within the scope of this invention are the non-toxic cationic, e.g., the pharmaceutically-acceptable, salts of the novel compounds of formula I in which one or both acid groups are involved in salt formation. Salts such as the sodium, aluminum, potassium, calcium, magnesium, ammonium and substituted ammonium salts, e.g., procaine, dibenzylamine, N,N'-dibenzylethylenediamine, N,N'-bis(dehydroabietyl)ethylenediamine, 1-ephenamine, N-ethylpiperidine, N-benzyl-β-phenethylamine, triethylamine, as well as salts with other amines which have been used to form salts with benzylpenicillin are of significant activity against the antibiotic resistant *Staphylococci* and are useful for the preparation of pharmaceutically elegant compositions of these valuable antibiotics.

The tertiary amino group-($R_6$)-includes tri(lower alkyl)amines and heterocyclic tertiary bases, such as pyridine and substituted pyridines, e.g., nicotine, 2-aminopyridine, nicotinamide, 2,4,6-trimethylpyridine, 3-hydroxypyridine, isoniconitinic acid, picolinic acid, pyrimidine, sulfadiazine, sulfathiazole and sulfapyridine. Additionally, other substituted pyridines, such as 2-hydroxymethylpyridine, 2-amino-6-methylpyridine, nicotinic acid, 3-acetylpyridine, pyridine-2,3-dicarboxylic acid; quinoline, piperidine; and ammonia, mono- and di-(lower alkyl)amines can also be used to produce related cephalosporin $C_A$ compounds. The point of attachment of the tertiary amine moiety ($R_6$, formula IV) is the N atom. The cephalosporin $C_A$ derivatives are believed to exist as zwitterions.

Of the lower alkyl, lower alkoxy, lower alkanoyl and carbo(lower)-alkoxy groups those having from 1 to 4 carbon atoms in the alkyl, alkoxy and alkanoyl moieties are preferred since the reactants bearing such groups are more readily available than are those required for such groups having a greater number of carbon atoms.

The novel compounds of this invention contain the common structural feature, the $\Delta^3$-cephem nucleus, a bicyclic ring system comprising a fused $\beta$-lactam ring in the 5,6-position of a 5,6-dihydro-2H-1,5-thiazine ring, and an N-acyl amino group in the 7-position of the precursor nuclei. They differ in the $-CH_2R_6$ moiety in the 3-position (formulae III–VI) below:

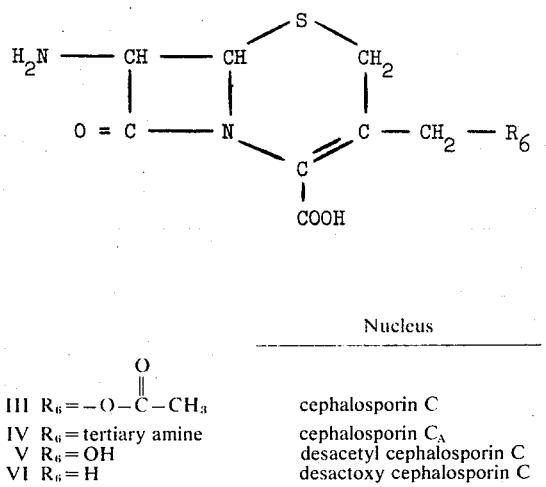

|  | Nucleus |
|---|---|
| III $R_6 = -O-\overset{O}{\underset{\|}{C}}-CH_3$ | cephalosporin C |
| IV $R_6$ = tertiary amine | cephalosporin $C_A$ |
| V $R_6$ = OH | desacetyl cephalosporin C |
| VI $R_6$ = H | desactoxy cephalosporin C |

For convenience, the novel compounds of formula I will be broadly referred to as cephalosporins. For more precise identification, they are named by reference to both the particular $(R_5O)(R_4O)(O)p-(CH_2)_n-CR_1R_2$—moiety attached to the $-CONH-$ group (formula I) at the 7-position and to the specific nucleus present. Thus, when the following acyl moiety $C_6H_5-CH[P(O)(OH)_2]-CO-$ is attached to the nucleus having formula III, the compound is named $\alpha$-phosphonobenzylcephalosporin C. The cephalosporins derived from the nuclei having formulae IV–VI are named as derivatives of the cephalosporin $C_A$, desacetyl cephalosporin C and desacetoxy cephalosporin C series, respectively.

In the case of the cephalosporin $C_A$ series, wherein a tertiary amino compound replaces the acetoxy group in the 3- position of cephalosporin C, the $C_A$ series is named (using pyridine as exemplary of the tertiary amine) as follows: $\alpha$-phosphonobenzyl cephalosporin $C_A$ (pyridine).

They can also be named as derivatives of $\Delta^3$-cephem (Morin et al., J. Am. Chem. Soc. 84, 3400, 1962). The above-mentioned cephalosporin C compound then becomes 3-acetoxymethyl-4-carboxy-7-($\alpha$-phosphono-$\alpha$-phenyl)-acetamido-$\Delta^3$-cephem. The corresponding desacetyl cephalosporin c, desacetoxy cephalosporin C and cephalosporin $C_A$ compounds are thus referred to as 3-hydroxymethyl-4-carboxy-7-($\alpha$-phosphono-$\alpha$-phenyl)acetamido-$\Delta^3$-cephem; 3-methyl-4-carboxy-7-($\alpha$-phosphono-$\alpha$-phenyl)acetamido-$\Delta^3$-cephem; and 3-pyridinomethyl-4-carboxy-7-($\alpha$-phosphono-$\alpha$-phenyl)acetamido-$\Delta^3$-cephem, respectively. For convenience and simplicity, however, these novel compounds will be named as analogs of cephalosporin C and its closely related derivatives.

In addition to their unexpected and significant activity against the antibiotic resistant Staphylococci and against Pseudomonas and Escherichia coli, the novel products of this invention are resistant to destruction by penicillinase, the penicillin destroying enzyme elaborated by many microorganisms, and are also antagonistic toward gram-positive micro-organisms.

The novel antibacterial products of this invention are of value as additives to materials such as fuels and cutting oils which are subject to bacterial deterioration and are useful in soaps and shampoos, and in topical compositions for treatment of wounds. They are also remarkably effective in treating a number of infections caused by susceptible gram-negative and gram-positive bacteria in poultry and animals including man. For such purposes, the pure materials of mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl cargonate, glycerol, sorbitol, etc.; buffering agents, as well as local anesthetics and inorganic salts to afford desirable pharmacological properties.

DETAILED DESCRIPTION OF THE INVENTION

The novel and valuable compounds of the present invention are prepared from 7-aminocephalosporanic acid and the closely related acids mentioned above by any of several known methods for introducing an acyl substituent into a primary amine. They can, for example, be prepared by the acylation, in a reaction-inert solvent, of 7-aminocephalosporanic acid or related acid with a functional derivative of the carboxy group of the appropriate phosphono- substituted acid reactant of the formula, $HOOC-CR_1R_2-(CH_2)_n-P(O)-(OR_4)(OR_5)$, such as the corresponding acid chloride, bromide or anhydride, especially the mixed anhydride with other carboxylic acids such as ethoxy and isobutoxy carbonic acid, at a pH value of from about 6 to about 9 and at a temperature of from about 0° C. to about 50° C. The acylation can be conducted under a wide variety of conditions. It can, for example, be conducted in an aqueous reaction medium of an unstable emulsion of water and a water-immiscible organic solvent such as methyl isobutyl ketone and lower alkyl acetates over the pH range of about 2 to 4 and a temperature range of about 0° C. to 50° C. It can also be carried out over the pH range of from about 6 to 9 in aqueous solution (water or water acetone) at a temperature of from 0° C to 50° C.

Alternatively, they can be prepared by the reaction of 7-aminocephalosporanic acid or related acid with the appropriate acid reactant in the presence of a condensing agent, e.g., a carbodiimide such as 1,3-dicyclohexylcarbodiimide or an alkoxyacetylene such as ethoxyacetylene. Additionally, the appropriate acid azide, or an active ester or thio ester of the carboxy moiety of the acid reactant with, for example, N-hydroxyphthalimide, N-hydroxysuccinimide, a phenol or thiophenol, can be used as acylating agent. Further, the 7-aminocephalosporanic or related acid can first be converted to a monoor disilyl derivative by reaction with a trialkylsilyl halide or a trialkylsilylamine which is then acylated with an appropriate organic acid acylating agent (a carboxylic acid, acid anhydride or acid halide) and hydrolyzed to remove the protecting group (the "silyl" method) as described in U.S. Pat. No. 3,249,633, issued May 3, 1966.

The phosphonalkanoic acid or phosphonocycloalkane carboxylic acid reactant of functional derivative thereof can, when $R_4$ and/or $R_5$ is hydrogen, depending, of course, upon the pH of the reaction mixture, be used as the free acid or as an alkali metal or amine salt of the phosphonic acid group. When at least one of $R_4$ and/or $R_5$ is hydrogen, the tri(lower alkyl)amine salts, especially the triethylamine salt, and the N-ethylpiperidinium salt represent convenient forms of the phosphonalkanoic or phosphonocycloalkane carboxylic acid reactant particularly when a mixed anhydride of the acid is used as acylating agent. Such salts are of definite value when the acylation is conducted in a non-aqueous system. In such instances an amine salt, e.g., the triethylamine or N-ethylpiperidine salt, of the 7-aminocephalosporanic acid or related acid serves as suitable form of the 7-aminocephalosporanic or related acid. The acylation, when conducted in a non-aqueous system, is generally conducted at an initial temperature of as low as −40° C. during the combining of the reactants and is then gradually raised to room temperature or higher, e.g., about 50° C., if necessary.

In addition to the above purely chemical techniques of acylation, a sonochemical technique, that is, the application of vibrations of ultrasonic frequency (35,000 to 90,000 cycles per second), as described in U.S. Pat. No. 3,079,314, issued Feb. 26, 1963, can also be used to achieve acylation of 7-aminocephalosporanic and related acids, especially acylation with an acid halide or anhydride. Acylation under such conditions is rapid and permissive of a wide range of reaction media, aqueous and non-aqueous alike, homogeneous and non-homogeneous, including emulsified, systems.

An alternative method for producing the compounds of formula I wherein $R_6$ is other than acetoxy comprises conversion of the appropriate cephalosporin C compound (formula I, $R_6$ = acetoxy) to the desired cephalosporin wherein $R_6$ is hydrogen, hydroxy or tertiary amino group by known methods. The cephalosporin $C_A$ series of compounds, for example, are readily obtained by treating the corresponding cephalosporin C with a tertiary amine of the type described herein according to the procedures described in Belgian Pat. No. 593,777, published Nov. 30, 1960, or in U.S. Pat. No. 3,217,000, issued Nov. 9, 1965. This comprises reacting the cephalosporin C compound with a 3 to 10 molar excess of the chosen tertiary amine at a pH of about 3 to 8.5 in aqueous solution at a temperature of from about 40° to 100° C. for a period of 4 to 8 hours. The desacetyl cephalosporin C compounds are produced by treating the cephalosporin C compound with citrus acetylesterase in an aqueous buffer at pH 6.5 to 7 for several hours according to the procedures described by Jeffery et.al., *Biochemical Journal* 81, 591-6 (1961) and U.S. Pat. No. 3,117,126, issued Jan. 7, 1964.

The desacetoxy cephalosporin C compounds are prepared by the procedures described by Morin et al., in U.S. Pat. Nos. 3,129,234 and 3,275,626, issued Apr. 14, 1964, and Sept. 27, 1966, respectively. The first method comprises catalytic hydrogenation of the appropriate cephalosporin C compounds in the presence of palladinized-charcoal. The second procedure involved rearrangement of the appropriate penicillin derivative to the desacetoxy cephalosporin C compound by first converting the penicillin to its sulfoxide derivative by reaction with an organic peracid or other source of active oxygen in aqueous solution at room temperature. The sulfoxide is then heated in the presence of a strong acid at temperature of about 100° to 175° C. for a period of up to 1 hour. The penicillin compounds are obtained by acylating 6-aminopenicillanic acid with the appropriate acid reactant, $HOOC-CR_1R_2-(CH_2)_n-P(O)(OR_4)(OR_5)$, or an active derivative thereof in the same manner as is described herein for the acylation of 7-aminocephalosporanic acid.

The desacetoxy cephalosporin C compounds can be transformed to cephalosporin C compounds by procedures described by Morin et al., *J. Am. Chem. Soc.* 85, 1896 (1963) and 91, 1401 (1969). The desacetoxy cephalosporin C methyl ester is subjected to mild hydrolysis in pyridine-water with sodium hydroxide to provide the $\Delta^2$-desacetoxycephalosporin acid derivative. This acid is converted to its p-methoxybenzyl ester by treatment with dimethylformamide dineopentyl acetal and p-methoxybenzyl alcohol in methylene chloride solution. The allylic methyl group of the p-methoxybenzyl ester is then brominated by azobisisobutyronitrile-initiated bromination and the bromo derivative treated with potassium acetate to afford a mixture of the $\Delta^2$- and $\Delta^3$-cephalosporin C p-methoxybenzyl isomers. The $\Delta^2,\Delta^3$-sulfide ester mixture is oxidized with m-chloroperbenzoic acid to give the $\Delta^3$-sulfoxide which is reduced (acetyl chloride-sodium dithionite) to the Δ³-cephalosporin C p-methoxybenzyl ester. Cleavage of the ester group with trifluoroacetic acid in benzene containing some anisole gives the cephalosporin C compound.

Of the several known methods for acylating 7-aminocephalosporanic acid and the related acids cited above, the favored routes employ an acid halide or mixed anhydride of the appropriate phosphono- substituted alkanoic acid reactant with the above-mentioned formula and an aqueous reaction media. The temperature range from 0° C. to 50° C. and a pH range of from 6 to 9 are favored.

The esters of this invention, compounds of formula I wherein $R_3$ is acyloxy(lower alkyl), are prepared by reacting an alkali metal salt (sodium, potassium, lithium) or in the case of the cephalosporin $C_A$ derivatives described herein, a tertiary lower alkyl amine salt (e.g., triethylamine) of the cephalosporins of formula I, wherein $R_3$ is hydrogen, with the appropriate acyloxy(lower alkyl)halide (chlorine or bromide) of the formula $R_3$-halide. The reaction is normally conducted in a reaction-inert solvent such as tetrahydrofuran, dimethylformamide, dimethylsulfoxide or hexamethylphosphoramide. In practice, the halide is added, preferably dropwise, to a solution or suspension of an alkali metal or amine salt of the compound of formula I, wherein $R_3$ is hydrogen. At least one mole of the halide reactant is added per mole of cephalosporin compound, but in certain cases it may be advantageous to employ as much as a 50 percent excess. The reaction may be carried out at temperatures of from 0° C. to 50° C., with a preferred range of from 20° C. to 30° C. Reaction time will vary according to the temperature employed and the reactivity of the appropriate starting materials. Normally, the reaction period will range anywhere from 1 to 20 hours.

It is generally preferred to introduce the acyloxy lower alkyl group into the cephalosporin as the last step when $R_6$ is teritary amino to minimize the likelihood of undesirable side-reactions which might occur if the tertiary amino group is put on subsequent to the acyloxy lower alkyl group.

The acyloxy(lower alkyl) esters can also be prepared by the above-described acylation procedures but using the appropriate acyloxy(lower alkyl) ester of the 4-carboxy group of 7-aminocephalosporanic acid or related acid in place of 7-aminocephalosporanic acid or related acid or a salt thereof. The acyloxy(lower alkyl) 7-aminocephalosporanates are prepared by reacting an alkali metal or amine salt of 7-aminocephalosporanic acid with the appropriate chloro (or bromo) lower alkyl acyloxy reactant in a suitable solvent as is described above and by Daehne et al., *J. Med. Chem.* 13, 607–612 (1970) for acyloxy lower alkyl esters of 6-aminopenicillanic acid.

The halides of the formula $R_3$-halide are synthesized from the corresponding acid chlorides and aldehydes or ketones in accordance with the general procedures of Ulich et al., *J. Am. Chem. Soc.* 43, 660 (1921) and Euranto et al., *Acta. Chem. Scand.* 20, 1273 (1966). The formation of esters from acid salts and alkyl halides is well-documented in the chemical literature (Zook and Wagner, "Synthetic Organic Chemistry," John Wiley and Sons, Inc., New York, 1956, p. 484).

The phosphonalkanoic acid reactants, $HOOC-CHR_1-(CH_2)_n-P(O)(OR_4)(OR_5)$ are prepared by the half-condensation of the appropriate alkylene bromide (or chloride), $Br-(CH_2)_n-Br$, with the sodio derivative of an ester of the appropriate malonic acid $R_1CH(COOR)_2$. The favored malonic acid esters are the methyl and ethyl esters. The ω-bromoalkyl malonate thus prepared is then saponified and decarboxylated to the corresponding α-$R_1$-ω-bromalkanoic acid $R_1-CH(COOH)-(CH_2)_n-Br$. The procedure used is that described by Salmon-Legagneur et al., *Bull. Soc. Chim. France*, 1263–70 (1956). The bromoalkanoic acid or an ester thereof is then reacted with a metal derivative (usually sodium) of the appropriate phosphite, $(R_4O)(R_5O)POH$, or with the appropriate tertiary phosphite. This latter reaction is convenient when the $R_4$ and $R_5$ moieties are identical. The reactions are conducted at a temperature of from about 25° C. to about 150° C. for several hours and with equimolar proportions of reactants. They are generally run in an organic solvent system such as a lower alkanol. The procedures used are essentially those of Nylen, Ber. 59, 1119–28 (1926) and of Arbuzov et al., *J. Russ. Phys. Chem. Soc.* 46, 295 (1914), respectively. These procedures are discussed by Kosolapoff in Chapter 7 of "Organophosphorous Compounds," John Wiley and Sons, Inc., New York, 1950.

The phosphonocycloalkane carboxylic acids are conveniently prepared from the precursor 1-bromo(or chloro)-1-cycloalkane carboxylic acid with the appropriate sodium phosphite as described above. The 1-(ω-phosphonoalkyl)-1-cycloalkane carboxylic acids are prepared from the corresponding methyl-1-carboxymethyl-1-cycloalkane carboxylates by reacting them with one equivalent of silver nitrate to form an insoluble silver salt which is collected, dried and treated with bromine, usually in carbon tetrachloride or other suitable solvent. The 1-carbo(lower alkoxy)-1-bromomethylcycloalkane is then reacted with the appropriate sodium phosphite, $(R_4O)(R_5O)PONa$, to give the 1-carbo-(lower alkoxy)-1-phosphonomethylcycloalkane.

Homologous 1-carbo(lower alkoxy)-1-(ω-phosphonoalkyl)cycloalkanes are produced by alkylating a malonic acid diester, usually a lower alkyl diester, such as the diethyl ester, with the 1-carbo(lower alkoxy)-1-bromomethylcycloalkane according to known procedures. The diethyl (1-carbomethoxycycloalkylmethyl)malonate is then saponified and decarboxylated to give a 1-carboxy-1-carboxyethylcycloalkane. Repetition of the procedure outlined produces a 1-carboxy-1-(ω-bromoalkyl)cycloalkane. This product is in turn converted to the next higher homolog by the above procedure. The bromoalkyl derivatives are also, of course, used to prepare the desired 1-carboxy-1-(ω-phosphonoalkyl)cycloalkanes. The sequence is repeated until the acid having the desired chain length $HOOC-CR_1R_2-(CH_2)_n-P(O)(OR_4)(OR_5)$ is obtained.

The novel cephalosporins described herein exhibit in vitro activity against a wide variety of micro-organisms, including both gram-positive and gram-negative bacteria. Their useful activity can readily be demonstrated by in vitro tests against various organisms in a brain-heart infusion medium by the usual two-fold serial dilution technique. The in vitro activity of the herein-described compounds renders them useful for topical application in the form of ointments, creams and the like, or for sterilization purposes, e.g., sick-room utensils.

These novel cephalosporins are also effective antibacterial agents in vivo in animals, including man, not only via the parenteral route of administration but also by the oral route of administration.

The oral and parenteral dosage levels for the herein-described compounds are, in general, on the order of up to 200 mg./kg. and 100 mg./kg. of the body weight per day, respectively.

Many of the cephalosporin ester compounds of this invention exhibit improved absorption on oral administration over that produced by the corresponding free acid or alkali metal salt forms. They, therefore, represent convenient and effective dosage forms of the novel cephalosporins of formula I above.

Further, many of the esters ($R_3$ = acyloxy lower alkyl) described herein, although inactive or of relatively low activity against gram-negative organisms per se are, when administered orally to animals, including man, metabolized to the parent acid, which has a wide spectrum of activity against gram-positive and gram-negative bacteria. They thus serve as pro-drug forms of the parent compounds since they are biologically converted in vivo to said compounds. The rate of metabolic conversion of such esters to the parent said occurs at such a rate as to provide an effective and prolonged concentration of the parent acid in the animal body. In effect, such esters act as depot sources for the parent acid. Especially useful in this respect are those compounds wherein the $R_3$ moiety of the ester group is benzoyloxymethyl-, acetoxymethyl-, pivaloyloxymethyl-, or 2-ethylbutyryloxymethyl.

Compounds of formula I wherein $R_1$ is benzyl, phenoxy or substituted derivatives thereof wherein the substituent is at least one of chloro, bromo, fluoro, lower alkyl, lower alkoxy and trifluoromethyl; heterocyclic 5- and 6-membered rings containing at least one of nitrogen, oxygen or sulfur, and fused heterocyclic radicals (thienyl, furyl, pyridyl, indolyl, thianaphthenyl, etc.) are also useful antibacterial agents.

Also effective as antibacterial agents are analogs of formula I compounds wherein $R_3$ is —C($R_7$)($R_8$)—O—CO—W in which $R_7$ is hydrogen and $R_8$ is selected from the group consisting of alkyl, alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine and alkoxy and alkylthio each containing up to 2 carbon atoms, alkyl, alkoxyalkyl and alkylthioalkyl each containing up to 6 carbon atoms, cycloalkyl of from 3 to 6 carbon atoms;

$R_7$ and $R_8$ when taken together with the carbon atom to which they are attached form a ring system of the formula

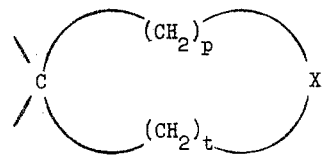

wherein X is selected from the group consisting of $CH_2$, O and S and $p$ and $t$ are each integers of from 1 to 3;

W is selected from the group consisting of cycloalkyl of from 3 to 8 carbon atoms, phenylalkyl and mono- and disubstituted phenylalkyl wherein said alkyl portion consists of 1 to 3 carbon atoms and said substituents are each chosen from the group consisting of chloro, bromo, fluoro, lower alkoxy, lower alkylthio, lower alkanoylamino, lower alkyl, trifluoromethyl and N,N-di-(n-propyl)sufamyl; phenyl and mono and disubstituted phenyl wherein the substituents are chosen from the group consisting of lower alkyl, lower alkoxy, chloro, bromo, fluoro and trifluoromethyl.

In addition, analogs of compounds of formula I wherein one or more of the oxygen atoms of the phosphono moiety is replaced by sulfur are also effective broad spectrum antibacterial agents. Such compounds are prepared by methods presented herein but using the appropriate thio analog of the phosphonoalkanoic acid reactant.

Compounds analogous to those of formula I but in which the $OR_5$ group is replaced by $R_5'$ to give the group —P(O)$R_5'$(O$R_4$) wherein $R_5'$ is $R_5$ and —NR'R'' are also effective antibacterial agents. The $R_4$ and $R_5$ groups are defined above and each of R' and R'' is hydrogen, lower alkyl, cycloalkyl, phenyl, substituted phenyl wherein the substituent is selected from the group consisting of lower alkyl, lower alkoxy, chloro, bromo, di(lower alkyl)amino, trifluoromethyl and carbo(lower alkoxy); 5- and 6-membered heterocyclic rings containing at least one of the hetero atoms N, O or sulfur, such as 2-pyridinyl, 2-thiazolyl, 2-pyrryl, 4-imidazolyl, 2-oxazolyl, 2-pyrimidinyl, 5-(1,2,4-triazolyl); fused 5- and 6- membered heterocyclic rings containing at least one N, O or S atom, e.g., 2-benzothiazolyl, 2-quinolyl and 2-indolyl. Such compounds are prepared by procedures described above for making compounds of formula I. The requisite phosphonalkanoic and phosphonocycloalkane carboxylic acid reactants HOOC—$CR_1R_2$—$(CH_2)_n$—P(O)$R_5'$(O$R_4$) are prepared by methods presented above for the analogous reactants but using the appropriate primary phosphonic acid or ester thereof $R_5'$P(O$R_4$)$_2$ in place of the tertiary phosphite. Such methods are discussed generally by Kosolapoff (loc. cit.).

The compounds of formula I described herein wherein $R_6$ is hydroxy are useful intermediates for the preparation of lactones involving the hydroxy group and the 4-carboxy group. The hydroxy group can be acylated according to known procedures to produce acylocy derivatives other then acetoxy; or reacted with isocyanates to produce 3-carbamoyl- derivatives. Further, nucleophiles other than tertiary amines can be introduced at the 3-position ($R_6$), e.g., azide, ethanethiol, thiobenzoate, xanthates, dithiocarbamates and thiourea (Abraham, *Quart. Rev.* 21, 239, 1967).

EXAMPLE I

α-PHOSPHONOBENZYLCEPHALOSPORIN C (VIA THE ACID ANHYDRIDE)

A mixture of the triethylamine salt of 7-aminocephalosporanic C acid (0.96 g.) and dry methylene chloride is cooled to −20° C. The triethylamine salt of the anhydride of α-phosphonophenylacetic acid with ethyl carbonate (1.15 g.) is added and, after 15 minutes, the mixture transferred to a wet ice bath. It is stirred for 1 hour, the ice bath removed and stirring continued for 2.5 hours. Concentration of the mixture under reduced pressure gave a yellow foam which became very sticky upon exposure to the atmosphere. The foam is taken up in methylene chloride (20 ml.), two equivalents of sodium 2-ethylhexanoate added and the disodium salt which precipitates recovered by filtration. It is purified by recrystallization from acetone-water.

The acid form of the product is obtained by acidifying an aqueous solution of the disodium salt to pH about 1.2 to 2.0 and extracting the acid solution with n-butanol. The acid form is recovered by lyophilization.

The anhydride of α-phosphonophenylacetic acid with ethyl carbonate is prepared by treating α-phosphonophenylacetic acid (0.01 mole) in dry acetone (20 ml.) with two equivalents of triethylamine. The solution is cooled to −20° C. and ethyl chloroformate (7.8 mM) added. The mixture is transferred to a 0° C. bath, stirred for 2 hours and filtered. The filtrate is concentrated and the residue dissolved in methylene chloride.

EXAMPLE II

α-(O,O-DIETHYLPHOSPHONO)BENZYLCEPHALOSPORIN C (VIA THE ACID CHLORIDE)

A mixture of freshly distilled thionyl chloride (3.64 ml., 5mM), α-(O,O-diethylphosphono)phenylacetic acid (1.085 g., 4 mM) and ether (2.0 ml.) is stirred under an atmosphere of nitrogen for 7 hours and then concentrated under reduced pressure. Ethylene dichloride (5.0 ml.) is added to the residue and the resulting solution taken to dryness. This step is repeated three times.

The α-(O,O-diethylphosphono)phenylacetyl chloride thus produced is dissolved in dry methylene chloride (1.5 ml.) and cooled to −70° C. A mixture of the triethylamine salt of 7-aminocephalosporanic C acid (1.34 g., 3.6 mM), dry methylene chloride (10 ml.) and triethylamine (1.12 ml. 8.0 mM) is added and the reaction mixture stirred for 10 minutes. The cooling bath is removed and the mixture allowed to stand overnight at room temperature. A large volume of ether is added to precipitate the product as a gum. The ether is decanted and methylene chloride:ether (70 ml. of a 4:1 solution) added to the residue. The mixture is thoroughly shaken and the methylene chloride:ether solution filtered. Ethyl acetate (50 ml.) is added to the filtrate and the resulting precipitate filtered and dried. It is taken up in methylene chloride (75 ml.), methanol (10 ml.) and sodium 2-ethyl hexanoate (2equivalents) in dry methyl isobutyl ketone added. The disodium salt is filtered and dried. It is purified by recrystallization from acetone:water.

EXAMPLE III

α-PHOSPHONOBENZYLCEPHALOSPORIN C (ACYLATION IN AQUEOUS EMULSION)

An aqueous solution of 7-aminocephalosporanic C acid (50 mM/ml.) at room temperature is adjusted to pH 2 with hydrochloric acid then converted witn one-half volume of methyl isobutyl ketone. The mixture is stirred vigorously, then α-triethylammoniumphosphonylphenylacetyl chloride (described below) added. Sodium hydroxide is added to the reaction mixture as necessary to maintain the pH at 2. After 1 hour, the reaction mixture, an emulsion, is filtered and the organic phase separated. The organic solution is centrifuged then dried ($Na_2SO_4$), and filtered. Sodium 2-ethyl hexanoate (0.11 mole) in dry methyl isobutyl ketone is added to the filtrate to give the disodium salt of α-phosphonobenzylcephalosporin C.

Repetition of this procedure but using ethyl acetate as solvent and pH values of 2 and 4 produces the same product.

The α-triethylammoniumphosphonylphenylacetyl chloride is prepared by treating α-phosphonophenylacetic acid (0.01 mole) in dry methylene chloride (20 ml.) with two equivalents of triethylamine and the solution cooled to −20° C. Thionyl chloride (10 percent excess) is added, the mixture transferred to a 0° C. bath, stirred for 2 hours and concentrated in vacuo.

EXAMPLE IV

α-PHOSPHONOBENZYLCEPHALOSPORIN C (VIA CARBODIIMIDE CONDENSING AGENT)

To a solution of α-phosphonophenylacetic acid (10.8 g.) in 40 ml. of tetrahydrofuran there is added 10.3 g. of 1,3-dicyclohexylcarbodiimide in 35 ml. of tetrahydrofuran followed by a solution of 7-aminocephalosporanic C acid (10.8 g.) in 300 ml. of water:tetrahydrofuran (1:1) containing sufficient sodium bicarbonate to give a pH of 7.8. The mixture is stirred at room temperature for 2 hours, then filtered to remove 1,3-dicyclohexylurea. The filtrate is diluted to 1,000 ml. with cold water, the aqueous layer adjusted to pH 2.8 with phosphoric acid and extracted with 2 X 200 ml. of cold nitromethane. The combined nitromethane extracts are washed with one-tenth volume of water and then extracted at pH 7.5 with one-half volume of water. The aqueous layer is washed with ether and lyophilized to give the sodium salt of α-phosphonobenzylcephalosporin C.

EXAMPLE V

O-(ETHYLPHOSPHONO)BENZYLDESACETOXYCEPHALOSPORIN C (VIA THE "SILYL" METHOD)

A suspension of hexamethyl disilazane (50 ml.) and 7-aminodesacetoxycephalosporanic C acid (21.4 g.) is heated under reflux at 80° C. for 4 hours and then at 120° C. for one-half hour while passing a stream of nitrogen through the mixture. Excess hexamethyl disilazane is removed by distillation in vacuo to leave a mixture of 7-aminodesacetoxycephalosporin C acid trimethyl silyl ester and N-trimethyl silyl 7-aminodesacetoxycephalosporanic C acid trimethyl silyl ester as a viscous oil. The residue is taken up in sufficient volume of dry tetrahydrofuran to provide 100 ml. of solution.

To 30 ml. of the solution thus obtained (equivalent to 6.42 g., 0.03 mole of 7-aminodesacetoxycephalosporanic C acid) is added triethylamine (3.64 g.). A solution of α-(O-ethylphosphono)phenylacetyl chloride (8.1 g.) in tetrahydrofuran (20 ml.) is added dropwise at 0°–5°C. with stirring. The mixture is allowed to stand for 3 hours, then poured into ethyl acetate (500 ml.) and cooled to 0°–5° c. Isopropanol (5 ml.) is added and, after 1 hour, the mixture filtered. A solution of two equivalents of sodium 2-ethyl hexanoate in ethyl acetate is added to the filtrate. The sodium salt of the title compound is rcovered by evaporation of the solvent in vacuo or by addition of a large volume of ether.

The use of α-phosphonophenylacetyl chloride in place of α-(O-ethylphosphono)phenylacetyl chloride in this procedure produces α-phosphonobenzyldesacetoxycephalosporin C.

EXAMPLE VI

α-(O,O-DIETHYLPHOSPHONO)BENZYLCEPHALOSPORIN C (VIA AN ACTIVE ESTER)

A mixture of 7-aminocephalosporanic C acid (1.3 g., 4.8 mM), triethylamine (0.970 g., 9.6 mM) and methylene chloride (75 ml.) is stirred at room temperature for 1 hour. The resulting solution is cooled to 0° C. and stirred under an atmosphere of nitrogen. A solution of the N-hydroxysuccinimide ester of α-(O,O-diethylphosphono)phenylacetic acid (1.8 g., 4.8 mM) in methylene chloride (25 ml.) is added dropwise over a one-half hour period. The solution is allowed to warm to room temperature and stirred for an additional 3 hours. An equal volume of water is added and the reaction mixture adjusted to pH 2.0 with 6N hydrochloric acid. The methylene chloride phase is separated, washed with brine, and dried with anhydrous sodium sulfate. Removal of the solvent under reduced pressure gives the product as a foam. The foam is taken up in ethyl acetate and the ethyl acetate solution extracted with aqueous sodium bicarbonate. Fresh ethyl acetate is added to the aqueous solution which is adjusted to pH 2.5 with 6N hydrocloric acid. The ethyl acetate phase is separated and the aqueous phase extracted again with ethyl acetate. The combined ethyl acetate extracts are washed with water, followed by brine, and dried ($Na_2SO_4$). Removal of the ethyl acetate gave 0.580 g. of product.

It is converted to the sodium salt by extracting an ethyl acetate solution of the acid form with aqueous sodium bicarbonate until the aqueous extract has a pH of 7.0, washing the aqueous extract with ethyl acetate and freeze-drying the aqueous solution (0.334 g., M.P. 120° C., dec.).

NMR data show the product to be an epimeric mixture.

Repetition of this procedure but using N-hydroxyphthalimide in place of N-hydroxysuccinimide produces the same product.

EXAMPLE VII

α-PHOSPHONOETHYLDESACETOXYCEPHALOSPORIN C

A. Via the "Silyl" Method

The mixed anhydride of α-phosphonopropionic acid with ethyl carbonate 3.7 g. (prepared according to the procedure of Example I from β-phosphonopropionic acid) in tetrahydrofuran (20 ml.) is added to 15 ml. of a solution of silylated 7-aminodesacetoxycephalosporanic C acid (prepared as described in Example V). The reaction mixture is stirred for 4 hours then added to a vigorously stirred solution of sodium bicarbonate (7.5 g.) in water (300 ml.). After thoroughly mixing, the benzene layer is separated. n-Butanol (75 ml.) is added to the aqueous solution which is then acidified to pH 1–2. The mixture is vigorously agitated, the n-butanol phase separated and the aqueous layer extracted with n-butanol (2 × 50 ml.). The combined n-butanol extracts are dried over anhydrous sodium sulfate and filtered. Potassium 2-ethyl hexanoate in butanol is added and the dipotassium salt of the title compound recovered by evaporation.

B. Via the Acid Chloride

Triethylamine (2.02 ml.) is added to a stirred solution of β-phosphonopropionic acid (0.75 g.) in dry methylene chloride (20 ml.) under nitrogen. The clear solution which forms is evaporated under reduced pressure. Ethylene dichloride (10 ml.) is added and the solvent evaporated off. This step is repeated twice to insure a complete water-free product. The residue is taken up in ethylene dichloride (20 ml.). The solution is cooled to 0° C., thionyl chloride (0.35 ml.) added and the reaction mixture stirred for 1.5 hours. It is then evaporated to dryness. Ethylene dichloride (10 ml.) is added to the residue and the solvent evaporated off. This step is repeated twice to insure a thionyl chloride-free product. The dry residue is dissolved in methylene chloride (10 ml.).

Five ml. of methylene chloride solution (0.0024 mole of β-phosphono(triethylammonium)propionyl chloride) is added over a 3-minute period to the triethylamine salt of 7-aminodesacetoxycephalosporanic C acid (0.52 g.) in methylene chloride (20 ml) at −70° C. under nitrogen. The mixture is stirred at −70° C. for one-half hour and at room temperature for 15 minutes. It is evaporated to dryness in vacuo, the residue triturated with acetone, the triethylamine hydrochloride filtered off and the acetone solution evaporated. Ethyl acetate (25 ml.) is added followed by sodium 2-ethyl hexanoate (0.08 g.) and acetone (25 ml.). The white solid—the disodium salt—is collected and dried under nitrogen.

C. Via the Mixed Anhydride Method

The mixed anhydride of β-phosphonopropionic acid with ethyl carbonate as its triethylamine salt (1.31 g.) is added all at once to a solution of the triethylamine salt of 7-aminodesacetoxycephalosporanic C acid (1.250 g.) in methylene chloride at −70° C. After ten minutes, the mixture is allowed to warm to 0° C. and stirred for one-half hour. The mixture is evaporated in vacuo without the application of heat, and the residue taken up in acetone (30 ml.). Sodium 2-ethyl hexanoate (0.80 g.) is added and the white precipitate which forms collected and dried.

EXAMPLE VIII

Following the methods of the preceding examples, the compounds listed below are prepared from appropriate reactants:

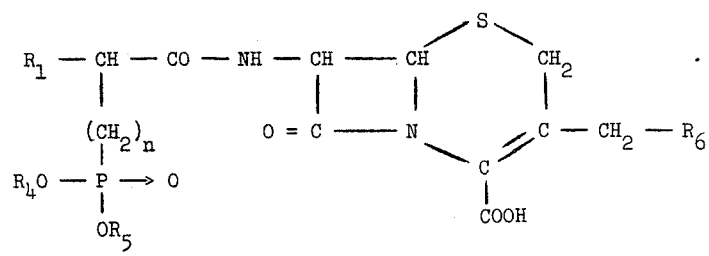

| $R_1$ | n | $R_4$ | $R_5$ | $R_6$— |
|---|---|---|---|---|
| H | 0 | H | H | Ac,H,Py |
| H | 0 | $CH_3$ | $CH_3$ | Ac,Py |
| H | 0 | n—$C_4H_9$ | H | Ac,OH,Py |
| $CH_3$ | 0 | $CH_3OCH_2CH_2$ | $CH_3OCH_2CH_2$ | Ac,NA |
| n—$C_4H_9$ | 0 | $C_2H_5$ | $C_2H_5$ | Ac,H |
| H | 1 | $FCH_2CH_2$ | $FCH_2CH_2$ | Ac,Im |
| H | 1 | i—$C_4H_9$ | i—$C_4H_9$ | Ac,H,Q |
| n—$C_3H_7$ | 1 | H | H | Ac,BzIm |
| H | 2 | H | H | Ac,AMP |
| $C_2H_5$ | 2 | $C_2H_5$ | H | Ac,OH |
| H | 3 | $CH_3$ | $CH_3$ | Ac,H |
| n—$C_4H_9$ | 3 | $CH_3O(CH_2)_4$— | $CH_3O(CH_2)_4$— | H,APy |
| H | 6 | H | H | Ac,OH |
| H | 6 | $FCH_2CH_2$ | $FCH_2CH_2$ | H |
| $C_2H_5$ | 6 | n—$C_4H_9$ | n—$C_4H_9$ | Ac,TMP |
| $C_2H_5$ | 6 | H | n—$C_4H_9$ | H,HPy |
| n—$C_4H_9$ | 6 | $CH_3$ | H | Ac |
| H | 8 | H | H | Ac,Py,Im |
| n—$C_3H_7$ | 8 | $C_2H_5$ | $C_2H_5$ | H,OH |
| $CH_3$ | 8 | $C_2H_5OCH_2CH_2$ | $C_2H_5OCH_2CH_2$ | H,STZ |
| $C_2H_5$ | 8 | $FCH_2CH_2$ | $FCH_2CH_2$ | OH,NA |
| H | 0 | $C_6H_5$ | $C_6H_5$ | Ac,H,Py |
| H | 0 | 4—$ClC_6H_4$ | 4—$ClC_6H_4$ | Ac |
| $CH_3$ | 0 | p-tolyl | p-tolyl | Ac,PA |
| n—$C_4H_9$ | 0 | 2—$CH_3OC_6H_4$ | 2—$CH_3OC_6H_4$ | Ac,PA |
| H | 1 | $C_6H_5$ | H | H |
| H | 1 | 3—$CH_3.C_6H_4$ | 3—$CF_3.C_6H_4$ | Ac,HPy |
| $CH_3$ | 1 | m-tolyl | H | Ac,OH |
| n—$C_3H_7$ | 1 | 2—$FC_6H_4$ | 2—$FC_6H_4$ | SPy |
| H | 2 | $C_6H_5$ | $C_6H_5$ | Ac,H |
| H | 2 | 4—t—$C_4H_9.C_6H_4$ | 4—t—$C_4H_9.C_6H_4$ | H,Q |
| $C_2H_5$ | 2 | 4—$C_4H_9OC_6H_4$ | 4—$C_4H_9OC_6H_4$ | OH |
| H | 4 | $C_6H_5$ | $C_6H_5$ | Ac,Py |
| $CH_3$ | 4 | 3—$BrC_6H_4$ | 3—$BrC_6H_4$ | Ac |
| H | 7 | $C_6H_5$ | H | Ac,AMP |
| H | 8 | $C_6H_5$ | $C_6H_5$ | Ac,OH |
| H | 8 | 2—$ClC_6H_4$ | 2—$ClC_6H_4$ | Ac,H,Im |
| $C_2H_5$ | 8 | 3—$FC_6H_4$ | 3—$FC_6H_4$ | Ac,H |
| $C_2H_5$ | 8 | 2—$CH_3OC_6H_4$ | 2—$CH_3OC_6H_4$ | APy |
| n—$C_4H_9$ | 8 | $C_6H_5$ | $C_6H_5$ | OH,Py |
| n—$C_4H_9$ | 8 | H | 4—$ClC_6H_4$ | Ac,SPy |
| $C_6H_5$ | 0 | H | H | H,OH,Py |
| $C_6H_5$ | 0 | $C_2H_5$ | $C_2H_5$ | H,OH,Py |
| $C_6H_5$ | 0 | n—$C_4H_9$ | n—$C_4H_9$ | Ac,OH,Py |
| 4—$ClC_6H_4$ | 0 | $FCH_2CH_2$ | $FCH_2CH_2$ | Ac,OH |
| 2—$CF_3C_6H_4$ | 0 | $CH_3OCH_2CH_2$ | $CH_3OCH_2CH_2$ | Ac,H |
| p-tolyl | 0 | H | $C_2H_5$ | Ac,Py |
| 4—t—$C_4H_9.C_6H_4$ | 0 | $C_2H_5$ | $C_2H_5$ | Ac,NA |
| $C_6H_5$ | 1 | H | H | Ac,H,OH |
| $C_6H_5$ | 1 | n—$C_3H_7$ | n—$C_3H_7$ | Ac,SPy |
| 2—$BrC_6H_4$ | 1 | $C_2H_5$ | $C_2H_5$ | Ac,H |
| m-tolyl | 1 | i—$C_4H_9$ | i—$C_4H_9$ | Ac,BzIm |
| 2—$C_2H_5.C_6H_4$ | 1 | $FCH_2CH_2$ | $FCH_2CH_2$ | Ac |
| 2—$CH_3OC_6H_4$ | 1 | $CH_3$ | $CH_3$ | OH |
| 4—n—$C_4H_9OC_6H_4$ | 1 | $CH_3$ | $CH_3$ | Ac,OH |
| 3—$CF_3.C_6H_4$ | 1 | $C_2H_5OCH_2CH_2$ | $C_2H_5OCH_2CH_2$ | Ac,Py |
| $C_6H_5$ | 2 | H | H | Ac |
| $C_6H_5$ | 2 | $C_2H_5$ | $C_2H_5$ | PA |
| 4—$ClC_6H_4$ | 2 | H | H | Q |
| 4—i—$C_3H_7.C_6H_4$ | 2 | $C_2H_5$ | $C_2H_5$ | H,OH |
| 4—$FC_6H_4$ | 2 | H | H | H,OH,Q |
| 4—$BrC_6H_4$ | 3 | $CH_3$ | $CH_3$ | Ac |
| o-tolyl | 3 | $CH_3$ | H | Ac,H |
| 4—t—$C_4H_9.C_6H_4$ | 3 | n—$C_4H_9$ | n—$C_4H_9$ | Ac,TMP |
| 4—$CF_3C_6H_4$ | 3 | H | H | Ac |
| $C_6H_5$ | 4 | H | H | Ac,H,OH,Py |
| 2—$CH_3OC_6H_4$ | 4 | $C_2H_5$ | $C_2H_5$ | Ac,OH |
| 2—$FC_6H_4$ | 4 | $CH_3$ | $CH_3$ | Ac,H |
| 4—$ClC_6H_4$ | 5 | $CH_3O(CH_2)_4$ | $CH_3O(CH_2)_4$ | Ac |
| p-tolyl | 5 | H | $C_2H_5$ | AMP |
| 3—$C_2H_5OC_6H_4$ | 5 | H | H | Ac |
| $C_6H_5$ | 6 | H | H | Ac,SPy |
| $C_6H_5$ | 6 | $C_2H_5$ | H | Ac |
| 2—$BrC_6H_4$ | 6 | n—$C_4H_9$ | n—$C_4H_9$ | Ac,INA |
| m-tolyl | 6 | $FCH_2CH_2$ | $FCH_2CH_2$ | H,OH |
| 4—$FC_6H_4$ | 6 | n—$C_4H_9OCH_2CH_2$ | n—$C_4H_9OCH_2CH_2$ | Ac |
| 4—$BrC_6H_4$ | 7 | $CH_3O(CH_2)_4$ | $CH_3O(CH_2)_4$ | Ac |
| 4—$CH_3OC_6H_4$ | 7 | H | H | H |
| $C_6H_5$ | 8 | H | H | Ac,Py |
| o-tolyl | 8 | i—$C_3H_7$ | i—$C_3H_7$ | H |
| 2—n—$C_4H_9.C_6H_4$ | 8 | H | H | H |
| 4—n—$C_4H_9OC_6H_4$ | 8 | H | H | Ac,OH |
| 4—$CF_3C_6H_4$ | 8 | $C_2H_5$ | $C_2H_5$ | Ac,PA |
| 2—$FC_6H_4$ | 8 | $C_2H_5$ | $C_2H_5$ | Ac,OH |
| $C_6H_5$ | 0 | $C_6H_5$ | $C_6H_5$ | Ac,H |
| $C_6H_5$ | 0 | 2—$ClC_6H_4$ | 2—$ClC_6H_4$ | Ac,HPy |
| 4—$ClC_6H_4$ | 0 | 4—$ClC_6H_4$ | 4—$ClC_6H_4$ | Ac,HPy |
| p-tolyl | 0 | p-tolyl | p-tolyl | H,OH |
| 3—$C_2H_5OC_6H_4$ | 0 | $C_6H_5$ | $C_6H_5$ | H,OH |
| $C_6H_5$ | 1 | $C_6H_5$ | $C_6H_5$ | Ac,H,OH,Q |
| 3—$ClC_6H_4$ | 1 | m-tolyl | m-tolyl | Ac,OH |
| 2—$BrC_6H_4$ | 1 | $C_6H_5$ | H | Ac,H |
| o-tolyl | 1 | $C_6H_5$ | $C_6H_5$ | Ac,OH |
| o-tolyl | 1 | H | H | Ac,H |

— Continued

| $R_1$ | n | $R_4$ | $R_5$ | $R_6=$ |
|---|---|---|---|---|
| 2—n—$C_4H_9.C_6H_4$ | 1 | $C_6H_5$ | $C_6H_5$ | Ac,NA |
| 2—$CH_3OC_6H_4$ | 1 | 4—$CF_3C_6H_4$ | 4—$CF_3C_6H_4$ | Ac,Py |
| 4—n—$C_4H_9OC_6H_4$ | 1 | 2—$ClC_6H_4$ | 2—$ClC_6H_4$ | Py |
| 2—$CF_3C_6H_4$ | 1 | H | H | Ac |
| 3—$FC_6H_4$ | 1 | H | H | Ac |
| $C_6H_5$ | 2 | 2—$BrC_6H_4$ | 2—$BrC_6H_4$ | Ac,H |
| 4—$ClC_6H_4$ | 2 | 4—$CH_3OC_6H_4$ | 4—$CH_3OC_6H_4$ | OH |
| 4—i—$C_3H_7.C_6H_4$ | 2 | H | H | OH,Im |
| 4—$BrC_6H_4$ | 3 | H | H | Ac |
| 4—$C_2H_5C_6H_4$ | 3 | H | $C_6H_5$ | Ac |
| 4—$CH_3OC_6H_4$ | 3 | 4—$FC_6H_4$ | 4—$FC_6H_4$ | Ac,AMP |
| 4—$CF_3C_6H_4$ | 3 | $C_6H_5$ | $C_6H_5$ | Ac |
| $C_6H_5$ | 4 | $C_6H_5$ | $C_6H_5$ | Ac |
| 2—$FC_6H_4$ | 4 | p-tolyl | p-tolyl | H |
| 3—$ClC_6H_4$ | 5 | H | H | H |
| 2—n—$C_4H_9.C_6H_4$ | 5 | H | H | Ac,SPy |
| 3—$C_2H_5OC_6H_4$ | 5 | $C_6H_5$ | $C_6H_5$ | H |
| $C_6H_5$ | 6 | 4—t—$C_4H_9.C_6H_4$ | 4—t—$C_4H_9.C_6H_4$ | OH |
| 4—$ClC_6H_4$ | 6 | H | H | OH,BzIm |
| m-tolyl | 6 | 4—$ClC_6H_4$ | 4—$ClC_6H_4$ | H |
| 4—$FC_6H_4$ | 6 | H | H | Ac,H |
| 4—$CH_3OC_6H_4$ | 7 | $C_6H_5$ | $C_6H_5$ | OH |
| $C_6H_5$ | 8 | 2—$CF_3C_6H_4$ | 2—$CF_3C_6H_4$ | Ac,Py |
| 2—$ClC_6H_4$ | 8 | H | H | H |
| p-tolyl | 8 | 4—n—$C_4H_9OC_6H_4$ | 4—n—$C_4H_9OC_6H_4$ | Ac,Q |
| 4—$CF_3C_6H_4$ | 8 | H | H | Ac |
| 2—$FC_6H_4$ | 8 | H | H | OH |

*Py = pyridine; APy = 2-aminopyridine; SPy = sulfapyridine; TMP = 2,4,6-trimethylpyridine; HPy = 3-hydroxypyridine; STZ = sulfathiazole; Pym = pyrimidine; Im = imidazole; BzIm = benzimidazole; NA = nicotinic acid; Ac = acetoxy; INA = isonicotinic acid; PA = picolinic acid; Q = quinoline; AMP = 2-amino-6-methylpyridine.

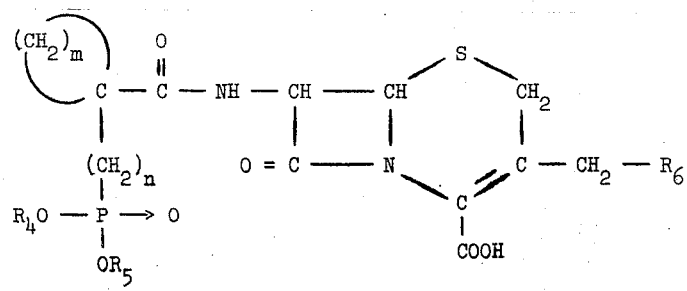

EXAMPLE IX
α-PHOSPHONOCYCLOHEXYLCEPHALOSPORIN C

To 1-phosphono-1-carboxycyclohexane (0.94 g.) in methylene chloride (20 ml.) is added triethylamine (1.3 ml.) and the resulting solution cooled to 0° C. Thionyl chloride (0.32 ml.) is added, the solution stirred for 1 hour and evaporated to dryness. The residue, the triethylammonium salt of 1-phosphono-1-chlorocarbonylcyclohexane, is dissolved in methylene chloride (10 ml.) and added dropwise over a 5-minute period to a mixture of triethylammonium 7-aminocephalosporanic C acid (1.67 g.) and triethylamine (0.6 ml.) in dry methylene chloride at −70° C. under an atmosphere of nitrogen.

The mixture is stirred for one-half hour at −70° C. and at room temperature for one-half hour. It is then evaporated to dryness under reduced pressure and the residue triturated with acetone. The acetone solution is evaporated to give the di-triethylammonium salt of the title product. It is converted to the disodium salt by dissolving in the minimum volume of acetone and treating the solution with sodium 2-ethyl hexanoate (1.30 g.) in ethyl acetate. The mixture is stirred for 15 minutes, the light tan precipitate filtered under nitrogen, washed with methylene chloride and dried.

Repetition of this procedure but using the 1-carboxy-1-(ω-phosphonoalkyl)cycloalkanes of Preparations D and H in place of 1-phosphono-1-carboxycyclohexane produces the following compounds as their disodium salts:

| m | n | $R_4$ | $R_5$ | $R_6$ |
|---|---|---|---|---|
| 2 | 0 | H | H | Ac,H,OH,Py |
| 2 | 1 | H | H | Ac,OH,APy |
| 2 | 4 | $CH_3$ | $CH_3$ | Ac,NA |
| 2 | 8 | H | H | Ac,OH,SPy |
| 2 | 0 | $C_2H_5$ | $C_2H_5$ | Ac,Py |
| 2 | 0 | $CH_3OCH_2CH_2$ | $CH_3OCH_2CH_2$ | Ac,Im |
| 2 | 1 | $C_6H_5$ | $C_6H_5$ | Ac,H |
| 2 | 1 | p-tolyl | H | H,OH,HPy |
| 3 | 0 | 4—$FC_6H_4$ | 4—$FC_6H_4$ | OH,Py |
| 3 | 1 | 2—Br—$C_6H_4$ | 2—Br—$C_6H_4$ | Ac,BzIm |
| 3 | 6 | H | H | Ac,Im |
| 3 | 0 | $CH_3$ | $CH_3$ | Ac,AMP |
| 3 | 0 | n—$C_4H_9$ | n—$C_4H_9$ | H,TMP |
| 3 | 0 | 2—$ClC_6H_4$ | 2—$ClC_6H_4$ | Ac,OH,NA |
| 3 | 1 | 2—$CH_3OC_6H_4$ | H | Ac |
| 3 | 3 | $CH_3$ | H | H,PA |
| 3 | 8 | H | H | Py,APy |
| 4 | 0 | H | H | Ac,H |
| 4 | 1 | 2—$CF_3C_6H_4$ | 2—$CF_3C_6H_4$ | Ac,H,Py |
| 4 | 3 | H | H | Ac,PA |
| 4 | 3 | $CH_3$ | $CH_3$ | Ac,Q |
| 4 | 3 | $C_6H_5$ | $C_6H_5$ | Ac,H |
| 4 | 0 | $CH_3OCH_2CH_2$ | $CH_2OCH_2CH_2$ | Ac,INA |
| 4 | 4 | $CH_3OCH_2CH_2$ | $CH_3OCH_2CH_2$ | Ac,Pym |
| 5 | 0 | H | H | Ac,OH |
| 5 | 1 | H | H | Ac,HPy |
| 5 | 5 | H | H | H,OH |
| 5 | 0 | i—$C_4H_9$ | i—$C_4H_9$ | Ac,STZ |
| 5 | 1 | o-tolyl | o-tolyl | Py |
| 5 | 0 | 4—$ClC_6H_4$ | 4—$ClC_6H_4$ | Ac |
| 6 | 0 | H | H | Ac,H,Q |
| 6 | 0 | $C_2H_5$ | $C_2H_5$ | Ac,H,OH |
| 6 | 0 | p-tolyl | p-tolyl | Ac,Im |
| 6 | 0 | 2—$CH_3OC_6H_4$ | 2—$CH_3OC_6H_4$ | Ac,OH |
| 6 | 1 | $CH_3$ | $CH_3$ | Ac,H,Py |
| 6 | 3 | 4—t—$C_4H_9.C_6H_4$ | 4—t—$C_4H_9.C_6H_4$ | Ac,H,NA |
| 6 | 6 | 4—$CF_3C_6H_4$ | 4—$CF_3C_6H_4$ | Ac,OH |
| 5 | 8 | $C_6H_5$ | $C_6H_5$ | Ac |

EXAMPLE X

ACETOXYMETHYL α-PHOSPHONOBENZYLCEPHALOSPORINATE C MONOSODIUM SALT

To 35 ml. of dry dimethylformamide contained in a 125 ml. three-necked flask, under a nitrogen atmosphere, is added 5.63 g. (0.0119 mole) of disodium α-phosphonobenzylcephalosporin C followed after 10 minutes by the dropwise addition of 1.40 g. (0.0129 mole) of chloromethyl acetate. The reaction mixture is allowed to remain at room temperature overnight. The dimethylformamide is evaporated in vacuo and the residue taken up in acetone. The sodium chloride is removed by filtration and the filtrate evaporated in vacuo to provide the crude product.

The crude product is purified by chromatography on Polyamide CC-6 with ethyl acetate. The first fraction (125 ml.) is concentrated in vacuo to provide the product as an amorphous solid.

EXAMPLE XI

PIVALOYLOXYMETHYL-α-PHOSPHONOBENZYLCEPHALOSPORINATE C

A. Triethylamine (0.004 mole) is added to pivaloyloxymethyl 7-aminocephalosporanate C (0.004 mole) in methylene chloride (25 ml.) and the mixture cooled to −70° C. α-Triethylammoniumphosphonophenylacetyl chloride (0.004 mole) is added and the mixture stirred at −70° C. for one-half hour followed by 1 hour at room temperature. It is evaporated in vacuo to a gum which is triturated with acetone and filtered. The filtrate is evaporated, the residue taken up in acetone (10 ml.) and sodium 2-ethyl hexanoate (one equivalent) added. The mixture is concentrated, treated with hexane-benzene (10-1) to precipitate the monosodium salt of the title product as a white solid.

The procedure is repeated but using the appropriate esters of Preparation J to produce acyloxymethyl-α-phosphonobenzylcephalosporinate C derivatives wherein the acyloxymethyl group is:

acetoxymethyl
propionoxymethyl
isobutyryloxymethyl
benzoyloxymethyl
α-ethyl-n-butyryloxymethyl
n-butyryloxymethyl B. Disodium α-phosphonobenzylcephalosporin C (1 mM) is dissolved in N,N-dimethylformamide (2 ml.) and chloromethyl pivalate (1.32 mM) added. The solution is stirred overnight at room temperature then evaporated in vacuo. The residue is dissolved in acetone, the sodium chloride filtered, and the acetone solution concentrated. Trituration of the residue with ether-hexane (1:1) gives the ester as a white powder.

C. Pivaloyloxymethyl 7-aminocephalosporanate C (1.27 g.) is acylated with the mixed anhydride of ethylcarbonate with α-phosphonobenzylcephalosporin C as its triethylamine salt (1.41 g.) in methylene chloride (25 ml.) at −70° C. The mixture is stirred for 10 minutes then allowed to come to 0° C. After a half-hour, it is allowed to reach room temperature. Sodium 2-ethyl hexanoate (0.54 g.) is added and the mixture evaporated in vacuo. The yellow gummy residue is stirred with benzene-hexane (1:10) and the white precipitate which forms collected and dried.

EXAMPLE XII

The cephalosporin compounds of Examples IV–IX are converted to the 3-acyloxy lower alkyl esters shown below by the procedure of Example XI. The ester groups have the formula:

$$-\overset{O}{\underset{\|}{C}}-O-\overset{H}{\underset{|}{\overset{|}{C}}}\overset{R_7}{\underset{|}{/}}-O-\overset{O}{\underset{\|}{C}}-W$$

| $R_7$ | W |
|---|---|
| H | $C(CH_3)_3$ |
| H | $CH_3$ |
| H | $C_6H_5$ |
| $CH_3$ | $CH_3$ |
| $CH_3$ | $C(CH_3)_3$ |
| $C_3H_7$ | $CH_3$ |
| H | $CH(C_2H_5)_2$ |
| $C_2H_5$ | $C_2H_5$ |
| H | $2(CH_3)C_6H_4$ |
| H | $CH_3$ |
| H | $4-ClC_6H_4$ |
| H | $C_3H_7$ |
| H | $4-(CF_3)C_6H_4$ |
| H | $4-BrC_6H_4$ |
| H | $4-FC_6H_4$ |
| $CH_3$ | $2-CH_3OC_6H_4$ |
| $CH_3$ | $4-(t-C_4H_9)C_6H_4$ |

EXAMPLE XIII

The salts of the cephalosporin products of Examples IV–XII are transformed to their acid forms by careful neutralization of aqueous solutions thereof with Dowex 50, acid form (a strong cation exchange sulfonated polystyrene resin available from The Dow Chemical Co.) and lyophilized, after filtration, to give the free acids.

EXAMPLE XIV

The free acids of the preceding examples are transformed to their mono-sodium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with one equivalent of the appropriate base. The salts are recovered by freeze-drying.

EXAMPLE XV

The free acids of Example XIII are converted to their di-sodium, potassium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with two equivalents of the appropriate base. The salts are recovered by freeze-drying.

EXAMPLE XVI

A tablet base is prepared by blending the following ingredients in the proportion by weight indicated:

| | |
|---|---|
| Sucrose | 80.0 |
| Tapioca starch | 12.5 |
| Magnesium stearate | 7.5 |

Sufficient α-phosphonobenzylcephalosporin C disodium salt is blended into the base to provide tablets containing 25, 100 and 250 mg. of active ingredient.

EXAMPLE XVII

Capsules containing 25, 100 and 250 mg. of active ingredient are prepared by blending pivaloyloxymethyl-α-phosphonobenzylcephalosporinate C in the following mixture (proportions given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XVIII

A suspension of α-phosphonocyclohexylcephalosporin $C_A$ (pyridine) is prepared with the following composition:

| | | |
|---|---|---|
| Penicillin compound | 31.42 | g. |
| 70% Aqueous sorbitol | 714.29 | g. |
| Glycerine, U.S.P. | 185.35 | g. |
| Gum acacia (10% solution) | 100.00 | ml. |
| Polyvinyl pyrrolidone | 0.50 | g. |
| Propyl parahydroxybenzoate | 0.172 | g. |
| Distilled water to make one liter | 0.094 | g. |

Various sweetening and flavoring agents may be added to this suspension, as well as acceptable coloring. The suspension contains approximately 25 mg. of cephalosporin compound per milliliter.

EXAMPLE XIX

A parenteral form of α-phenyl-β-phosphonoethyldesacetoxycephalosporin C is prepared by dissolving an intimate mixture of the disodium salt of the cephalosporin compound and sodium citrate (4 percent by weight) in sufficient polyethylene glycol 200 such that the final concentration of the cephalosporin compound is 25 mg. of active ingredient per milliliter. The resulting solution is sterilized by filtration and sterilely stoppered in vials.

In like manner, formulations of the products of this invention are made.

PREPARATION A

DIETHYL ARYL MALONATES

The following aryl malonic acids are prepared by the method of Wallingford et al., *J. Am. Chem. Soc.* 63, 2056–2059 (1964) which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture.

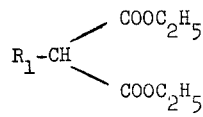

| $R_1$ | $R_1$ |
|---|---|
| 2-methoxyphenyl | 3-isopropylphenyl |
| 3-methoxyphenyl | 2-n-butylphenyl |
| 4-methoxyphenyl | 3-ethoxyphenyl |
| 2-trifluuoromethylphenyl* | 2-n-butoxyphenyl |
| 3-trifluoromethylphenyl | 4-n-butoxyphenyl |
| 4-trifluoromethylphenyl | 4-t-butylphenyl |
| 2-isopropylphenyl | |

*The necessary o-trifluoromethylphenylacetic acid is prepared from o-trifluoromethylbenzonitrile by the procedure of Corse et al., J. Am. Chem. Soc. 70, 2841 (1948) which comprises: (a) conversion of the nitrile to o-trifluoromethylacetophenone by a Grignard reaction with methylmagnesium iodide followed by hydrolysis; (b) reaction of the acetophenone with sulfur and morpholino at 135° C. for 16 hours followed by treatment with glacial acetic acid and hydrochloric acid.

The diethyl arylmalonates thus produced are hydrolyzed and decarboxylated by the methods of Preparation C to give the corresponding arylacetic acids.

PREPARATION B

ARYLACETIC ACIDS

The substituted arylacetic acids listed below are prepared by the Arndt and Eistert synthesis as described by Burger et al., *J. Org. Chem.* 5, 606–9 (1940). The procedure is exemplified by the preparation of 4-trifluoromethylphenylacetic acid.

To an ethereal solution of diazomethane (obtained from 225 g. of N-nitrosomethylurea) is added 4-trifluoromethylbenzoyl chloride (0.5 mole) and the reaction mixture allowed to stand overnight. The ether is distilled off to give the diazo ketone which is recrystallized from benzene.

A solution of the diazo ketone (0.25 mole) in dioxane is treated with concentrated ammonium hydroxide (330 ml.) and silver nitrate solution (66.5 ml. of 10 percent solution) at 60°–70° C. The mixture is refluxed for 2 hours, cooled and the product, the amide derivative, precipitated by the addition of water. It is filtered off, washed and dried.

The amide (25 g.) and potassium hydroxide (50 g.) in alcohol (500 ml.) are refluxed for 5 hours after which the solution is diluted with hot water. It is then concentrated to 125 ml. and acidified to precipitate the acid which is filtered and dried.

The following arylacetic acids are prepared in like manner from appropriately substituted benzoyl chlorides:

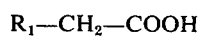

$$R_1-CH_2-COOH$$

| $R_1$ | $R_1$ |
|---|---|
| 2-CF$_3$phenyl | 2-n-butoxyphenyl |
| 3-CF$_3$phenyl | 3-ethoxyphenyl |
| 4-t-butylphenyl | 2-n-butylphenyl |
| 4-isopropoxyphenyl | 3-n-butylphenyl |
| | 4-fluorophenyl |

The acids are esterified according to known procedures.

The above-named arylacetic acids and those of Preparation A are converted to their corresponding α-bromo acids by the procedure described by Narayanan et al., *J. Med. Chem.* 9, 616 (1966).

The appropriate arylacetic acid (0.25 mole) and thionyl chloride (50 ml.) are heated under reflux for 2 hours. The mixture is cooled slightly and bromine (0.275 mole) added over a 3-hour period to the mixture under gentle reflux. The mixture is allowed to stand overnight and the excess thionyl chloride removed under reduced pressure. The residue is added to cold water (200 ml.), the mixture stirred for 3 hours at room temperature and extracted with ether. The ethereal solution is dried ($Na_2SO_4$) and evaporated. The product is purified by distillation in vacuo, if desired.

PREPARATION C

2-PHENYL-6-BROMO-N-CAPROIC ACID

Metallic sodium (0.25 mole) is dissolved in absolute ethanol (80 ml.) and to the mixture diethyl phenylmalonate (0.5 mole) added. Pentamethylene bromide (0.25 mole) is added, the mixture stirred and then kept at 0° C. for 2 hours. The product is taken up in water and ether, the ethereal solution separated, washed with water, dried ($Na_2SO_4$) and evaporated. The residue is fractionally distilled in vacuo to give diethyl 6-bromohexylphenylmalonate.

A mixture of diethyl 6-bromohexylphenylmalonate and 48 percent aqueous hydrobromic acid (4 ml./g. of ester) is refluxed under nitrogen until carbon dioxide is no longer evolved. The mixture is cooled and extracted with ether several times. The extract is washed with aqueous sodium sulfate and dried over anhydrous sodium sulfate. The 2-phenyl-6-bromo-n-caproic acid is recovered by evaporation.

Repetition of this procedure, but using the appropriate diethylarylmalonate and alkylene bromide $Br-(CH_2)_n-Br$ reactants, produces the following compounds:

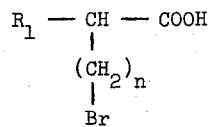

| $R_1$ | n | $R_1$ | n |
|---|---|---|---|
| phenyl | 1 | 4-chlorophenyl | 2 |
| phenyl | 2 | 4-chlorophenyl | 6 |
| phenyl | 4 | 2-bromophenyl | 1 |
| phenyl | 6 | 2-bromophenyl | 6 |
| phenyl | 8 | 3-bromophenyl | 4 |
| 2-chlorophenyl | 1 | 4-bromophenyl | 1 |
| 2-chlorophenyl | 3 | 4-bromophenyl | 3 |
| 2-chlorophenyl | 6 | 4-bromophenyl | 7 |
| 2-chlorophenyl | 8 | 2-methylphenyl | 1 |
| 3-chlorophenyl | 1 | 2-methylphenyl | 3 |
| 3-chlorophenyl | 5 | 2-methylphenyl | 8 |
| 3-methylphenyl | 1 | 3-ethoxyphenyl | 5 |
| 3-methylphenyl | 6 | 4-methoxyphenyl | 3 |
| 4-methylphenyl | 1 | 4-methoxyphenyl | 7 |
| 4-methylphenyl | 5 | 4-n-butoxyphenyl | 1 |
| 4-methylphenyl | 8 | 4-n-butoxyphenyl | 8 |
| 2-ethylphenyl | 1 | 2-($CF_3$)phenyl | 1 |
| 4-ethylphenyl | 3 | 2-($CF_3$)phenyl | 8 |
| 4-isopropylphenyl | 2 | 3-($CF_3$)phenyl | 1 |
| 2-n-butylphenyl | 1 | 4-($CF_3$)phenyl | 1 |
| 2-n-butylphenyl | 5 | 4-($CF_3$)phenyl | 3 |
| 2-n-butylphenyl | 8 | 4-($CF_3$)phenyl | 8 |
| 4-n-butylphenyl | 1 | 2-fluorophenyl | 1 |
| 4-t-butylphenyl | 3 | 2-fluorophenyl | 4 |
| 4-t-butylphenyl | 8 | 2-fluorophenyl | 8 |
| 2-methoxyphenyl | 1 | 3-fluorophenyl | 1 |
| 2-methoxyphenyl | 4 | 3-fluorophenyl | 7 |
| 2-methoxyphenyl | 8 | 4-fluorophenyl | 2 |
| 3-ethoxyphenyl | 1 | 4-fluorophenyl | 6 |

In the preparation of those products wherein $R_1$ is lower alkoxyphenyl, the diethyl ω-bromoalkyl[(lower alkoxy)phenyl]malonates are saponified with one equivalent of sodium hydroxide in water at room temperature until neutral. The reaction mixture is then carefully acidified to form the halfester half-acid which is then extracted with ether. The residue obtained by evaporation of the ethereal solution is heated at 100°–150° C. to bring about decarboxylation. The resulting 2-[(lower alkoxy)phenyl]-ω-bromoalkanoic acid ethyl ester is saponified with one equivalent of aqueous sodium hydroxide to the corresponding sodium salt. Acidification and extraction of the mixture with ether provide the acid upon evaporation of the ether.

PREPARATION D

2-PHENYL-6-(0,0-DIETHYLPHOSPHONO)-N-CAPROIC ACID

Diethylphosphite (0.25 mole) and sodium (0.25 mole) are reacted together in hexane (125 ml.) with good stirring at gentle reflux. To the resulting solution is added 6-bromo-2-phenyl-n-caproic acid sodium salt gradually over a 3-hour period. The mixture is then refluxed for 4 hours, allowed to stand overnight at room temperature, then evaporated under reduced pressure.

The residue is taken up in ether and the solution shaken thoroughly with water containing one equivalent of hydrogen chloride. The ether solution is separated, washed with water and dried ($Na_2SO_4$). Removal of the ether gives the title product.

The remaining products of Preparation B and those of C, E, F and G are likewise converted to the appropriate phosphono acid derivatives. The necessary phosphites of formula $(R_4O)_2POH$ prepared by well-known procedures described in Kosolapoff (loc. cit.), Chapter 8, from phosphorous trichloride and the appropriate alcohol or phenol $R_4OH$).

PREPARATION E

1-CARBOXYL-1-BROMOMETHYLCYCLOBUTANE

A. 1-Carbomethoxy-1-carboxymethylcyclobutane

1-Carboxy-1-carboxymethylcyclobutane, (5 g.) in methanol (25 ml.) containing concentrated sulfuric acid (0.5 ml.) is refluxed for 3 hours. The mixture is cooled and poured into a saturated aqueous solution of sodium bicarbonate. The aqueous solution is extracted with ether, the ethereal solution dried ($Na_2SO_4$) and evaporated to provide 1-carbomethoxy-1-carbomethoxymethylcyclobutane.

A solution of the dimethyl ester (3.0 g.) in methanol (20 ml.) is added to a solution of one equivalent of potassium hydroxide in water (8 ml.). After standing for 36 hours, the methanol is removed under reduced pressure and the residue diluted with water (15 ml.) and extracted with ether. The aqueous phase is acidified to pH 2 with 6N hydrochloric acid and extracted with ethyl acetate. The extract is dried ($Na_2SO_4$) and evaporated to provide the mono ester: 1-carbomethoxy-1-carboxymethylcyclobutane.

B. 1-Carbomethoxy-1-bromomethylcyclobutane

1-Carbomethoxy-1-carboxymethylcyclobutane (2.0 g.) is dissolved in one equivalent of 0.2N potassium hydroxide and one equivalent of silver nitrate in water is added. The silver salt which precipitates is filtered off, washed successively with water, methanol, acetone and ether, and dried at 90° C. and 20 mm. pressure for 12 hours. The salt is suspended in dry carbon tetrachloride (5 ml.), bromine (one equivalent) in carbon tetrachloride (1 ml.) added and the mixture refluxed for 2 hours. The precipitated silver bromide is filtered, the filtrate washed with 5 percent aqueous sodium carbonate, then dried ($Na_2SO_4$) and concentrated to give the product.

In like manner, the homologous 1-carboxy-1-bromomethylcycloalkanes wherein the cycloalkane moiety is cyclopropane, cyclopentane, cyclohexane and cycloheptane are prepared from the appropriate 1-carboxy-1-carboxymethylcycloalkane.

PREPARATION F

1CARBOXY-1-(2-BROMOETHYL)CYCLOBUTANE

A. Diethyl(1-carbomethoxycyclobutylmethyl)malonate

Diethyl malonate is alkylated with 1-carbomethoxy-1-bromomethylcyclobutane as follows:

Diethyl malonate (1.65 g.) is added slowly to a solution of sodium ethoxide (one equivalent) in absolute ethanol (20 ml.) at 50° C. To the clear solution is then added 1-carbomethoxy-1-bromomethylcyclobutane (2.0 g.) dropwise so as to avoid the need for cooling the mixture. The mixture is refluxed for 2 hours, the alcohol distilled off and the residue treated with water (25 ml.) and shaken thoroughly. The ester layer is separated and distilled in vacuo.

B. 1-Carboxy-1-carboxyethylcyclobutane

The ester product of (A) above (2.9 g.) is added slowly to a gently refluxing solution of potassium hydroxide (2.25 g.) in water (10 ml.). The mixture is refluxed for an additional 2 hours then diluted with an equal volume of water and the alcohol distilled from the solution.

The aqueous solution is cooled, acidified with 9N aqueous sulfuric acid and refluxed for 2 hours. It is then cooled and extracted with ether. The ethereal extract is dried ($Na_2SO_4$) and evaporated to give the product.

It is then converted to 1-carboxy-1-(2-bromoethyl)-cyclobutane by the procedure of Preparation E.

PREPARATION G

The following compounds are prepared by repetition of the procedures of Preparations E and F from appropriate reactants. The procedure comprises the reaction sequence outlined below for increasing the chain length of the bromoalkyl chain.

The following compounds are thus prepared:

| m | n |
|---|---|
| 2 | 0,1,4,8 |
| 3 | 0,1,3,6,8 |
| 4 | 0,1,3,4 |
| 5 | 0,1,5 |
| 6 | 0,1,3,6 |

PREPARATION H

PHOSPHONOALKANOIC ACIDS AND PHOSPHONOCYCLOALKANE CARBOXYLIC ACIDS

The phosphono acid compounds of formula I described herein are prepared by acylating the appropriate 7-aminocephalosporanic acid compound with the appropriate phosphonoalkanoic acid or phosphonocycloalkane carboxylic acid $HOOC—CR_1R_2—(CH_2)_n—PO(OH)_2$ or reactive derivative thereof according to methods presented herein. These acids are prepared by hydrolysis of an ester of the phosphono acid. The general procedure comprises refluxing the appropriate ester, $HOOC—CR_1R_2—(CH_2)$ $n—PO(OR_4)(OR_5)$, with concentrated hydrochloric or hydrobromic acid for several hours (e.g., 10 to 40 hours). The reaction mixture is cooled, diluted with an equal volume of water and concentrated under reduced pressure. This process is repeated several times to remove all the acid. The residue is the desired phosphono acid.

In the case of those esters wherein $R_1$ contains an alkoxy group, the hydrolysis is conducted with dilute acid in a closed tube at 125° C. to 150° C. Alternatively, aqueous alkali is used.

PREPARATION I

PARTIAL HYDROLYSIS OF PHOSPHONO ACID DIESTERS

The phosphonoalkanoic acids and phosphonocycloalkane carboxylic acids $HOOC—CR_1R_2—(CH_2)$ $n—PO(OR_4)(OR_5)$ wherein only one of $R_4$ or $R_5$ is hydrogen are prepared by treating a diester with excess 10 percent aqueous sodium hydroxide at reflux for a period of from about 4 to about 12 hours. A molar ratio of diester to sodium hydroxide of about 1:5 to about 1:7 is convenient. The reaction mixture is cooled and treated with Dowex 50 (a strong cation exchange resin, a sulfonated polystyrene, available from the Dow Chemical Company, Midland, Michigan) to a pH of about 1.5 to 2.0. The mixture is filtered and the product recovered by standard methods; e.g., organic sol-

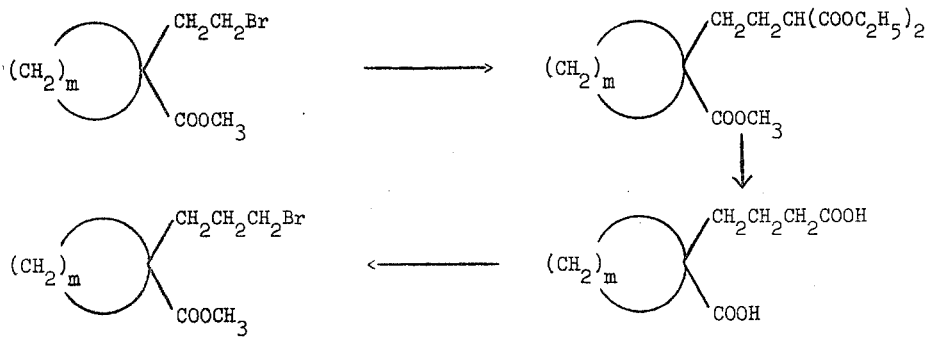

vent extraction followed by removal of the solvent, by evaporation of the aqueous filtrate if water soluble.

PREPARATION J

PIVALOYLOXYMETHYL 7-AMINOCEPHALOSPORANATE C

A mixture of triethylamine (14 ml., 0.14 mole), 7-aminocephalosporanic C acid (27.2 g., 0.1 mole) and N,N-dimethylformamide (100 ml.) is stirred at room temperature for one-half hour. Chloromethyl pivalate (29.6 g., 0.2 mole) is added and the mixture stirred for 4 hours at room temperature. The reaction mixture is diluted with ethyl acetate (300 ml.) and filtered to remove triethylamine hydrochloride. The filtrate is washed with water (4 × 75 ml.), then dried and concentrated under reduced pressure to give the crude ester.

The hydrochloride salt is formed by adding an isopropanol solution of hydrochloric acid to an ethyl acetate solution of the ester. The salt is recovered by filtration and recrystallized from methanol-ethyl acetate.

In this manner, the following salts are prepared from the appropriate acids: acetate, p-toluenesulfonate, benzoate, butyrate, hydrobromide, sulfate, nitrate 2-hydroxy-3-carboxynaphthoate, citrate, lactate, glycolate and laurate.

The above procedure is repeated but using the appropriate 7-aminocephalosporanic acid reactant and the chloroalkyl ester of the appropriate organic acid to give:

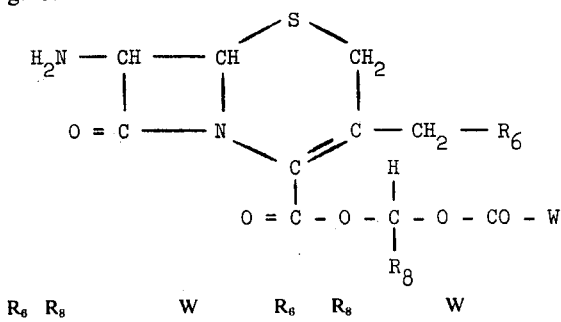

| $R_6$ | $R_8$ | W | $R_6$ | $R_8$ | W |
|---|---|---|---|---|---|
| Ac | H | $CH(C_2H_5)_2$ | Py | $CH_3$ | $C(CH_3)_3$ |
| Ac | H | $C_6H_5$ | H | H | $C(CH_3)_3$ |
| Ac | H | $4-ClC_6H_4$ | H | H | $CH(C_2H_5)_2$ |
| Ac | H | $4-(CH_3)C_6H_4$ | H | H | $CH_3$ |
| Ac | $CH_3$ | $CH_3$ | H | H | $C_6H_5$ |
| Ac | H | $3-FC_6H_4$ | H | H | $4-ClC_6H_4$ |
| Ac | H | $2-(CF_3)C_6H_4$ | H | H | $C_3H_7$ |
| Ac | $CH_3$ | $CH(C_2H_5)_2$ | H | $CH_3$ | $C(CH_3)_3$ |
| Ac | H | $2-(CH_3O)C_6H_4$ | H | H | $C_2H_5$ |
| Ac | $C_2H_5$ | $C_2H_5$ | H | $C_2H_5$ | $C_6H_5$ |
| Ac | H | $4-BrC_6H_4$ | H | $CH_3$ | $3-BrC_6H_4$ |
| Ac | H | $C_3H_7$ | OH | H | $C_2H_5$ |
| Py | H | $C(CH_3)_3$ | OH | H | $C_6H_5$ |
| Py | H | $CH(C_2H_5)_2$ | OH | H | $CH_3$ |
| Py | H | $C_6H_5$ | OH | H | $C(CH_3)_3$ |
| Py | H | $C_2H_5$ | OH | $C_2H_5$ | $C_2H_5$ |
| Py | H | $CH_3$ | OH | H | $C_3H_7$ |
| Py | H | $C_6H_5$ | OH | H | $CH(C_2H_5)_2$ |
| | | | OH | $C_3H_7$ | $C_6H_5$ |

What is claimed is:
1. A compound of the formula

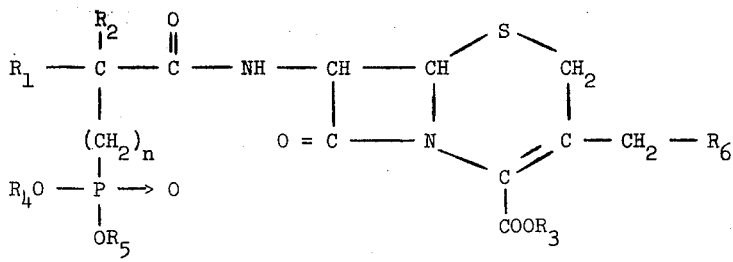

and the non-toxic cationic salts thereof wherein $R_1$ is selected from the group consisting of hydrogen, lower alkyl, phenyl and substituted phenyl wherein the substituent is selected from the group consisting of lower alkyl, lower alkoxy, chloro, bromo, fluoro and trifluoromethyl;

$R_2$ is hydrogen;

$R_1$ and $R_2$ when taken together with the carbon atom to which they are attached are selected from the group consisting of cycloalkyl of from four to six carbon atoms;

$R_3$ is selected from the group consisting of hydrogen and acyloxy lower alkyl wherein the acyloxy moiety is selected from the group consisting of lower alkanoyloxy, and benzoyloxy and substituted benzoyloxy wherein the substituent is selected from the group consisting of chloro, bromo, fluoro, lower alkyl, lower alkoxy trifluoromethyl;

each of $R_4$ and $R_5$ is selected from the group consisting of hydrogen, lower alkyl, substituted lower alkyl wherein the substituent is selected from the group consisting of lower alkoxy and fluoro; phenyl and substituted phenyl wherein the substituent is selected from the group consisting of chloro, bromo, fluoro, lower alkoxy, lower alkyl annd trifluoromethyl;

$R_6$ is selected from the group consisting of hydrogen, hydroxy, acetoxy and pyridine; and $n$ is 0 or an integer from 1 to 4.

2. A compound according to claim 1 wherein $R_1$ is phenyl, each of $R_2$ and $R_3$ is hydrogen, each of $R_4$ and $R_5$ is lower alkyl, $R_6$ is tertiary amino, and $n$ is 0.

3. A compound according to claim 1 wherein $R_1$ is phenyl, each of $R_2$, $R_4$ and $R_5$ is hydrogen, $R_3$ is acyloxy lower alkyl, $R_6$ is acetoxy and $n$ is 0.

4. A compound according to claim 1 wherein $R_1$ is lower alkyl, each of $R_2$, $R_4$ and $R_5$ is hydrogen, $R_3$ is acyloxy lower alkyl, $R_6$ is acetoxy and $n$ is 1.

5. A compound according to claim 1 wherein $R_1$ and $R_2$ together with the carbon atom to which they are attached are cycloalkyl, $R_3$ is acyloxy lower alkyl, each of $R_4$ and $R_5$ is lower alkyl, $R_6$ is acetoxy and $n$ is 0.

6. α-(O,O-diethylphosphono)benzylcephalosporin $C_A$ (pyridine), a compound according to claim 2 wherein $R_1$ is phenyl, each of $R_2$ and $R_3$ is hydrogen, each of $R_4$ and $R_5$ is ethyl, $R_6$ is pyridine and $n$ is 0.

7. Acetoxymethyl-α-phosphonobenzylcephalosporinate C, a compound according to claim 3 wherein $R_1$ is phenyl, each of $R_2$, $R_4$ and $R_5$ is hydrogen, $R_3$ is acetoxymethyl, $R_6$ is acetoxy and $n$ is 0.

8. Pivaloyloxymethyl-α-phosphonobenzylcephalosporinate C, a compound according to claim 3 wherein $R_1$ is phenyl, each of $R_2$, $R_4$ and $R_5$ is hydrogen, $R_3$ is pivaloyloxymethyl, $R_6$ is acetoxy and $n$ is 0.

9. Acetoxymethyl-α-methyl-β-phosphonoethylcephalosporinate C, a compound according to claim 4 wherein $R_1$ is methyl, each of $R_2$, $R_4$ and $R_5$ is hydrogen, $R_3$ is acetoxymethyl, $R_6$ is acetoxy and $n$ is 1.

10. Acetoxymethyl-α-(0,0-diethylphosphono)cyclohexylcephalosporinate C, a compound according to claim 5 wherein $R_1$ and $R_2$ together with the carbon atom to which they are attached are cyclohexyl, $R_3$ is acetoxymethyl, each of $R_4$ and $R_5$ is ethyl, $R_6$ is acetoxy and $n$ is 0.

11. A compound of the formula

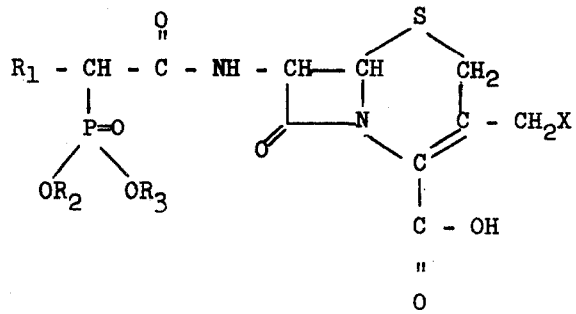

wherein $R_1$ is lower alkyl and phenyl; $R_2$ and $R_3$ represent hydrogen, lower alkyl and phenyl and X represents hydrogen, hydroxy and acetoxy.

12. A compound of the formula:

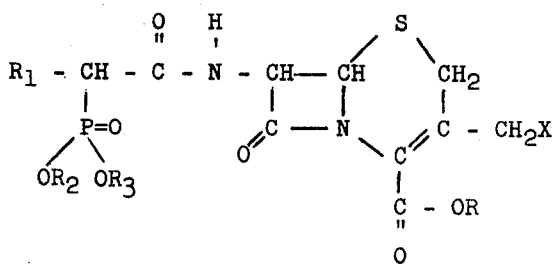

wherein:
$R_1$, $R_2$ and $R_3$ are H, lower alkyl, phenyl or substituted phenyl, wherein the substituent is chloro or bromo, lower alkyl or lower alkoxy;

R is H or the group

R is H or the group $- CH_2-O-\overset{O}{\underset{\|}{C}}-R_4$;

$R_4$ is lower alkyl, phenyl or substituted phenyl, wherein the substituent is chloro or bromo, lower alkyl or lower alkoxy;

X is hydrogen, hydroxy, acetoxy or pyridine;

and the non-toxic pharmaceutically acceptable salts thereof.

* * * * *

UNITED STATES PATENT OFFICE
CERTIFICATE OF CORRECTION

PATENT NO. : 3,870,713
DATED : March 11, 1975
INVENTOR(S) : Ernest S. Hamanaka

It is certified that error appears in the above—identified patent and that said Letters Patent are hereby corrected as shown below:

Title page, under the heading "[*] Notice:", "Aug. 6, 1974" should read -- Aug. 6, 1991 --.

Col. 2, line 3, after " -" first occurrence insert -- ( -- .

Col. 3, line 56, "p" should read -- P --.

Col. 22, line 5 "2-trifluuoromethyl" should read -- 2-trifluoromethyl --.

Col. 28, lines 15-18, delete "and substituted... trifluoromethyl".

Signed and sealed this 1st day of July 1975.

(SEAL)
Attest:

RUTH C. MASON
Attesting Officer

C. MARSHALL DANN
Commissioner of Patents
and Trademarks